(12) United States Patent
Murphy

(10) Patent No.: US 8,494,693 B2
(45) Date of Patent: Jul. 23, 2013

(54) VERTICAL REQUIRED NAVIGATION PERFORMANCE CONTAINMENT WITH RADIO ALTITUDE

(75) Inventor: Timothy Allen Murphy, Everett, WA (US)

(73) Assignee: The Boeing Company, Chicago, IL (US)

(*) Notice: Subject to any disclaimer, the term of this patent is extended or adjusted under 35 U.S.C. 154(b) by 577 days.

(21) Appl. No.: 12/535,731

(22) Filed: Aug. 5, 2009

(65) Prior Publication Data

US 2011/0035080 A1 Feb. 10, 2011

(51) Int. Cl.
*G06F 19/00* (2006.01)

(52) U.S. Cl.
USPC ............ 701/18; 701/4; 701/8; 701/9; 701/16; 340/970; 340/947; 340/951; 707/E17.44; 73/178 R; 73/178 T

(58) Field of Classification Search
USPC ................. 701/8–9, 4–5, 15–17, 18; 340/963, 340/972, 971, 967, 970, 977, 979, 974, 947, 340/951; 342/5, 122, 120, 33; 707/E17.044; 73/178 T, 178 R
See application file for complete search history.

(56) References Cited

U.S. PATENT DOCUMENTS

| | | | |
|---|---|---|---|
| 4,250,505 A * | 2/1981 | Kirner | 342/33 |
| 6,281,832 B1 | 8/2001 | McElreath | |
| 6,426,717 B1 * | 7/2002 | Maloratsky | 342/122 |
| 6,711,478 B2 * | 3/2004 | Hilb | 701/8 |
| 6,980,892 B1 * | 12/2005 | Chen et al. | 701/9 |
| 7,295,901 B1 * | 11/2007 | Little et al. | 701/16 |
| 8,332,083 B1 * | 12/2012 | McCusker | 701/4 |
| 2003/0016160 A1 | 1/2003 | Lok et al. | |
| 2004/0186635 A1 * | 9/2004 | Manfred | 701/4 |
| 2005/0237235 A1 | 10/2005 | Falcati et al. | |
| 2008/0140270 A1 | 6/2008 | Davis et al. | |
| 2008/0172149 A1 | 7/2008 | Rouquette et al. | |
| 2008/0234882 A1 * | 9/2008 | Villaume et al. | 701/9 |
| 2009/0195412 A1 | 8/2009 | Chen | |
| 2009/0195413 A1 | 8/2009 | Constans | |
| 2011/0035080 A1 * | 2/2011 | Murphy | 701/9 |

OTHER PUBLICATIONS

Vertical path trajectory prediction for next generation ATM; Warren, A.W.; Ebrahimi, Y.S.; Digital Avionics Systems Conference, 1998. Proceedings., 17th DASC. The AIAA/IEEE/SAE; Volume: 2; Digital Object Identifier: 10.1109/DASC.1998.739809 Publication Year: 1998 , pp. F11/1-F11/8 vol. 2.*

(Continued)

*Primary Examiner* — Cuong H Nguyen
(74) *Attorney, Agent, or Firm* — Ostrager Chong Flaherty & Broitman P.C.

(57) ABSTRACT

A monitor on-board an aircraft which uses radio altitude measurements as the basic observable altitude during runway approach. The basic concept utilizes the aircraft's navigation system, which includes means to store and retrieve radio altitude thresholds as a function of the distance along the desired path from the runway thresholds. These threshold functions are determined in advance based on a radio altitude reference which is defined as the expected radio altimeter measurement that would be made if the airplane were exactly on the desired reference path. Vertical containment monitoring is achieved by comparing the radio altitude measurement to computed thresholds for both too high and too low. During the approach, an annunciation message can be generated if the radio altitude measurement is above or below the threshold limits. Using this monitor ensures that the total system error for the aircraft is contained within a bound called the Vertical Containment Level of the desired reference path in space with a probability that is specified.

14 Claims, 5 Drawing Sheets

OTHER PUBLICATIONS

Minimum time trajectories for a class of V/STOL aircrafts; Naldi, R.; Marconi, L.; Control and Decision Conference (CCDC), 2010 Chinese; Digital Object Identifier: 10.1109/CCDC.2010.5498873; Publication Year: 2010, pp. 2097-2102.*

Minimum time trajectories for a class of V/STOL aircrafts; Naldi, R.; Marconi, L.; Control and Decision Conference (CCDC), 2010 Chinese; Digital Object Identifier: 10.1109/CCDC.2010.5498873; Publication Year: 2010, pp. 2097-2102.*

Air ground collaboration through delegated separation: Results of simulations for arrivals to closely spaced parallel runways; Domino, D.A.; Tuomey, D.; Mundra, A.; Smith, A.; Stassen, H.P.; Integrated Communications, Navigation and Surveilance Conf (ICNS), 2011; Digital Object Id: 10.1109/ICNSURV.2011.5935347; Pub Yr 2011, pp. M7-1-M7.*

Path generation for ground target tracking of airplane-typed UAV; Ruangwiset, A.; Robotics and Biomimetics, 2008. ROBIO 2008. IEEE International Conference on; Digital Object Identifier: 10.1109/ROBIO.2009.4913197; Pub Yr: 2009, pp. 1354-1358.*

U.K. Search Report, Nov. 22, 2010.

* cited by examiner

VERTICAL REQUIRED NAVIGATION PERFORMANCE CONTAINMENT WITH RADIO ALTITUDE

BACKGROUND

This invention generally relates to systems for safely guiding the landing of aircraft. In particular, the present invention relates to means for monitoring total system error performance for Vertical Navigation (VNAV) approaches based on baro-altimetry.

Significant time and money has been invested in developing Required Navigation Performance (RNP)-based approaches. These approaches use baro-altimetry as the reference for vertical guidance. These approaches have until the current time been limited to minimum Decision Heights (DH) of 250 ft. In practice, the decision heights are often even higher than this theoretical minimum due to obstacles etc.

The current baro-altimetry-based vertical guidance systems (commonly called baro-VNAV systems) are vulnerable to certain common mode failures which could compromise safety. These include: incorrect barometric corrections settings entered by pilots, incorrect barometric corrections provided by Air Traffic Control (ATC), altitude measurement errors due to extreme temperatures and common mode failures that can affect baro-VNAV systems such as volcanic ash.

There is a perception within the industry that the baro-VNAV approach systems vertical position error cannot be bounded to a very high degree of confidence, mostly due to the common mode failure conditions discussed above.

The existing vertical guidance and/or position monitoring systems include: (1) the current baro-VNAV systems as they exist today; (2) satellite-based vertical guidance systems, in particular: (a) Space Based Augmentation Systems (SBAS, e.g., the FAA's Wide Area Augmentation System); and (b) Ground Based Augmentation Systems (GBAS, e.g., the FAA's Local Area Augmentation System (LAAS)); and (3) Enhanced Ground Proximity Warning Systems (EGPWS), which monitor only for unintentional Flight into Terrain (FIT) and not for performance relative to a defined reference path. Each of the existing options has disadvantages.

(1) Current baro-VNAV systems are available essentially 100% of the time and can theoretically work everywhere. However, these systems are always limited to higher minimums than the lowest CAT I minimums. Furthermore, the systems are vulnerable to certain common mode failures as discussed above.

(2) The disadvantages of SBAS-based vertical guidance systems are manifold. SBAS service is only available in some locations. For example, the Wide Area Augmentation System (WAAS) can provide vertical guidance sufficient to support CAT I operations but only in North America (primarily the Contiguous United States (CONUS)) and only with an availability of about 99%. Furthermore, airplane equipage to enable SBAS-based vertical guidance is costly and would be of limited or no use outside SBAS coverage.

(3) While GBAS should have high availability and should easily meet the requirements for CAT I approach operations, a GBAS ground station is still a significant investment (~$1.5 million per site). Also, airplane equipage for GBAS (and the airplane function that uses GBAS, called GBAS Landing Systems (GLS)) is significant. The GLS function is not yet available on all models.

(4) The EGPWS does not provide guidance. It provides monitoring only. Currently EGPWS do not have knowledge of the intended or desired approach path. Consequently EGPWS do not monitor performance relative to the desired path. The monitoring by EGPWS is strictly to detect impending inadvertent flight into terrain. Currently the EGPWS monitoring is not used when the airplane gets near the ground on a precision approach.

There is a need for a system that would allow baro-altimetry-based approaches to be safely used to the lowest Category I minimums (i.e., 200 ft Decision Height and ½ mile Runway Visual Range (RVR)) or lower and that would allow common mode failures to be positively detected and mitigated.

BRIEF SUMMARY

One aspect of the invention is means to enable a lower decision height or altitude for landing when performing a VNAV approach by monitoring total vertical navigation system error performance for barometric altimeter-referenced approaches using independent radio altimeter observations and predetermined altitude threshold limits based on a radio altitude reference and expected barometric altimeter performance.

The invention disclosed herein may enable the use of lower approach decision altitude height limits when using vertical navigation performance-based approaches which use barometric-referenced altimetry. The invention provides a method to positively detect and mitigate common mode failures which could compromise flight safety, such as incorrect barometric settings entered by pilots, incorrect barometric settings provided by ATC, altitude measurement errors due to extreme temperatures, or other common mode failures that can affect barometric systems such as volcanic ash. Currently barometric altimetry-based approaches are limited to a decision height of 250 ft or higher due to obstacles along the route of flight. The instant invention will may enable barometric altimetry-based approaches to be safely flown to the lowest Category I minimums of 200 ft Decision Height and ½ mile Runway Visual Range.

The monitoring system disclosed herein allows the total system error performance to be bounded or contained with a specified probability. Total system error is defined as the difference between the desired position of the aircraft and the actual position of the aircraft. Total system error containment means the probability that the true airplane position is farther than a distance indicated by the containment limit away from the desired position is less than a targeted containment risk.

The invention is based on implementing a monitor which uses radio altitude measurements as the basic observable altitude. The basic concept utilizes the aircraft's navigation system which includes means to store and retrieve radio altitude thresholds as a function of the distance along the desired path from the runway thresholds. These threshold functions are determined in advance based on a radio altitude reference which is defined as the expected radio altimeter measurement that would be made if the airplane were exactly on the desired reference path. Vertical containment monitoring is achieved by comparing the instantaneous radio altitude measurement to computed thresholds for conditions where the airplane is too high or too low relative to the desired path. During the approach, an annunciation message can be generated if the instantaneous radio altitude measurement is above or below the threshold limits. Using this monitor ensures that the total system error for the aircraft is contained within a bound called the Vertical Containment Level of the desired reference path in space with a probability that is specified.

In accordance with a first aspect of the invention, monitoring implemented in the airborne equipment detects unacceptably large deviations of airplane positions from a desired reference path. This monitoring compares radio altitude measurements to thresholds stored on board the aircraft. The thresholds are a function of a distance along the desired path and are derived from a radio altitude reference measurement expected if the airplane were on the desired approach path. The desired reference path need not be stored in a database on the airplane. Nor is there any need for a terrain database to be stored on the airplane.

In accordance with a second aspect of the invention, a system and a process for determining the appropriate radio altitude reference for a specific approach are provided. More specifically, the system comprises an Automatic Flight Reference System (AFRS) that is deployed on one or more airplanes to collect data and means for the AFRS-recorded data to be automatically and regularly returned to a central processing facility for analysis. A method of analysis determines appropriate radio altitude reference measurements based on observations recorded by an AFRS during one or more approaches to a specific runway of interest. A method of computing appropriate thresholds for the monitor based on radio altitude reference is provided, along with means to deliver the computed thresholds to aircraft for use when flying the procedures using vertical containment monitoring to support lower minimums.

In accordance with a third aspect of the invention, a method for computing a vertical containment bound based on the thresholds and a model for the radio altimeter errors is provided.

Other aspects of the invention are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Figure 1:
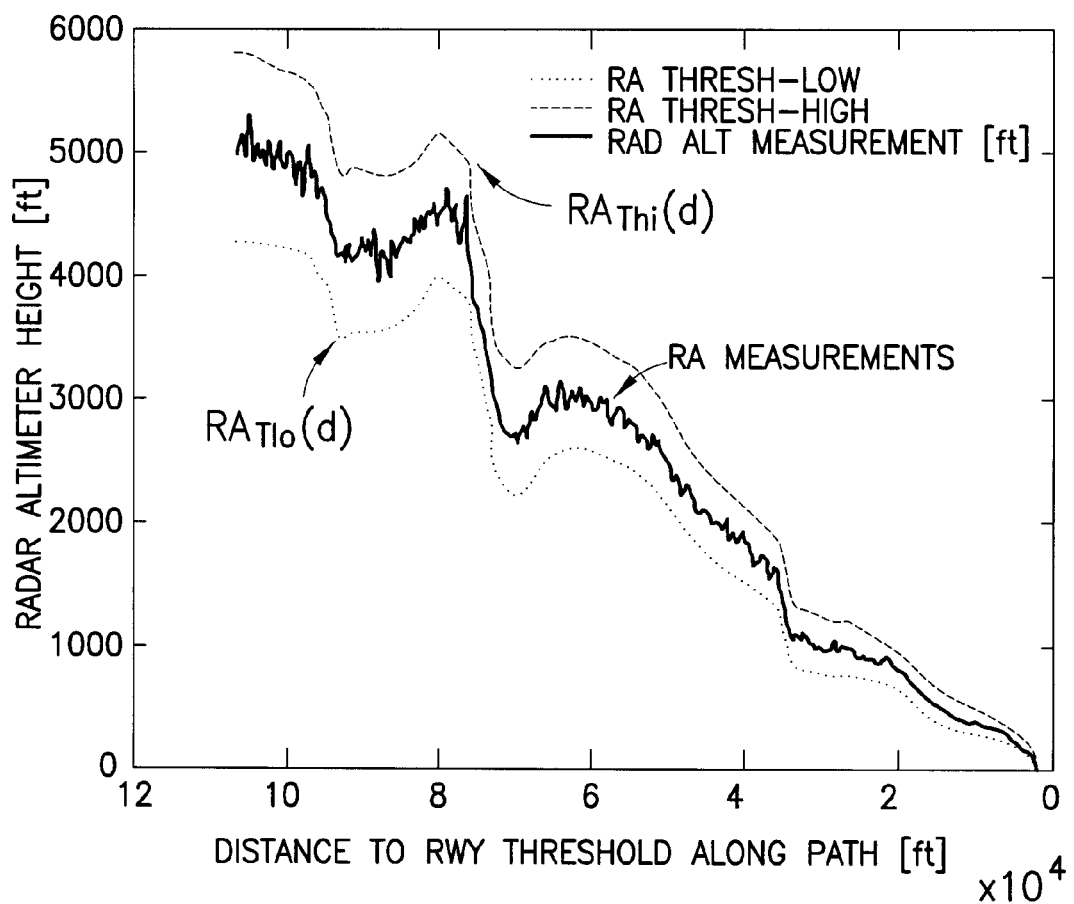
FIG. 1 is a graph illustrating the basic concept for vertical RNP containment monitoring with radio altitude.

The following features will be disclosed in detail hereinafter: (1) a monitor for detecting unacceptable deviation of true airplane vertical position from a desired reference path; (2) means for determining the appropriate thresholds for said monitor; (3) a process for developing and maintaining the monitors over time via a so-called "Net Centric Navigation Service"; and (4) a system of using non-tactical GPS and RA measurements of airplane position in a post-processing system to derive the reference path which is the basis for the monitor.

The solution disclosed hereinafter differs from existing solutions in the following ways:

(1) existing solutions do not monitor total system error through cross comparison based on an independent dissimilar sensor type;

(2) existing solutions typically only allow for bounding or containment of navigation system error;

(3) the present solution addresses (and effectively mitigates) common mode error sources associated with baro-VNAV guidance systems;

(4) the present solution differs from EGPWS in several ways: (a) the monitor thresholds are based on expected RA measurements, and are not derived from a terrain database (EGPWS uses a terrain database); (b) the Vertical RNP Containment (VRNPC) scheme disclosed herein does not use vertical GPS (GNSS) information at all (EGPWS does use vertical GPS blended with baro- and radio altitudes to monitor for potential Controlled Flight into Terrain (CFIT)); (c) VRNPC is monitoring for acceptable performance relative to a reference path, not for potential CFIT; (d) the system disclosed herein cross compares sensors to do fault detection (EGPWS does not); (e) the system disclosed herein monitors for "too high" conditions as well as "too low" conditions (EGPWS is only interested in conditions where there is a potential for CFIT—no analogous "too high" conditions).

The Monitor Design and Vertical Containment

The solution disclosed herein provides a means to independently monitor the vertical total system performance during a baro-VNAV approach. This allows the total system error (TSE) performance of the system to be bounded or contained. TSE is defined as the difference between the desired position of the aircraft and the actual position of the aircraft. TSE containment means that the probability that the true airplane position is farther than the containment limit away from the desired position is less than a target containment risk:

$$p(|\text{Pos\_true} - \text{Pos\_desired}|) > C_V) \leq P_{CR} \quad [1]$$

where Pos_true is the true vertical position of the airplane; Pos_desired is the vertical position of the desired reference path point at the same horizontal distance from the threshold as Pos_true; $C_V$ is the vertical error magnitude containment requirement at the associated distance from the threshold; and $P_{CR}$ is the target probability for being outside the containment.

The system and process disclosed herein are based on implementing a monitor that uses RA measurements as the basic observable. The basic concept is as follows. The airplane navigation system includes the means to store and retrieve RA thresholds as a function of the distance along the desired path from the runway thresholds. These threshold functions $RA_T(d)$ (where d is the horizontal distance from the threshold) are determined in advance based on a Radio Altitude Reference $RA_{Ref}(d)$ which is defined as the expected RA measurement (also a function of distance along the desired path from the runway threshold) that would be made if the airplane were exactly on the desired reference path. The process for determining $RA_{Ref}(d)$ will be described later herein.

Vertical containment monitoring is achieved by comparing the instantaneous RA measurement to the $RA_T(d)$. Thresholds for both too high and too low are computed ($RA_{Thi}(d)$ and $RA_{Tlo}(D)$ respectively). During the approach, an annunciation similar to the "Unable RNP" message currently used in a known RNP implementation can be generated if the instantaneous RA measurement made when the indicated position of the airplane is a distance d from the threshold is greater than $RA_{Thi}(d)$ or is less than $RA_{Tlo}(d)$. It will be shown hereinafter that using this monitor ensures that the total system error (TSE) of the airplane is contained within a bound called the Vertical Containment Level (VCL(d)) of the desired reference path in space with a probability that is specified. VCL(D) is analogous to the so called "Protection Levels" used in GNSS augmentation systems to bound the instantaneous Navigation System Error (NSE). A major difference is that VCL(D) bounds the airplane TSE, which includes contributions of NSE (i.e., sensor failures etc.) and of Flight Technical Error (FTE) (i.e., the inability of the pilot or autopilot to maintain tracking of the indicated path).

FIG. 1 Illustrates the basic concept for the Vertical RNP Containment (VRNPC) monitoring with radio altitude. In this case, the instantaneous RA measurements never exceed either of the two thresholds, so no alert would be generated. Note the plots in FIG. 1 are based on model-generated data and are for illustration purposes only. The thresholds are shown to splay as a function of distance because the underlying error models are expected to increase with altitude. The thresholds for the monitor are set based on the expected accuracy of the baro-altitude being used for guidance as well as the expected FTE performance of the particular airplane. The threshold levels are set to ensure an acceptable probability of false alarms (i.e., false indications that the airplane is in danger of leaving the containment bound). If there is no faulted condition, then the RA thresholds should only be crossed due to fault-free baro-altitude errors, fault-free RA errors, and fault-free FTE characteristics. A statistical model for the combination of these three fault-free error sources can be developed and used to set the threshold levels. A detailed discussion of how to do this is given later herein.

Figure 2:
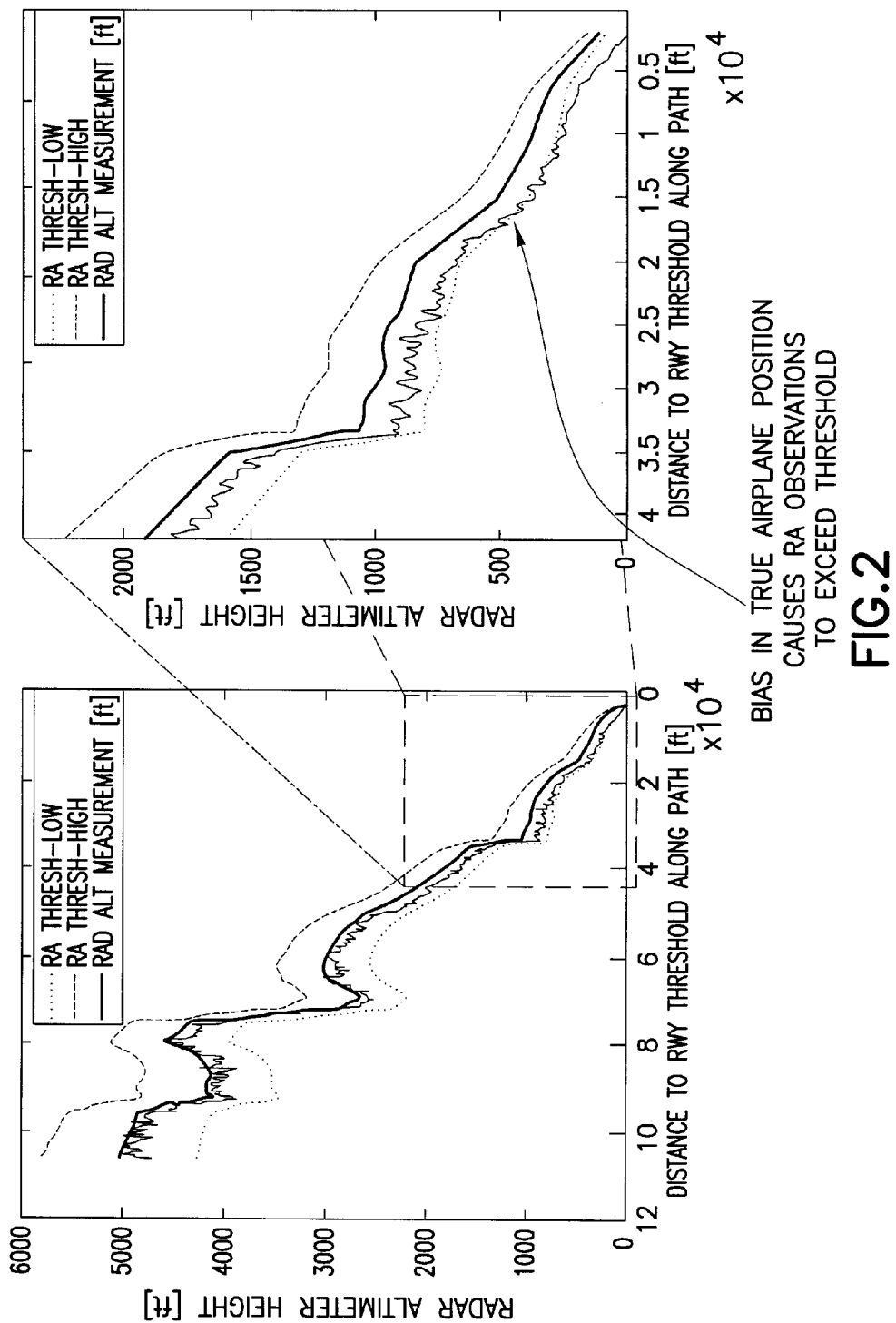
FIG. 2 is a graph illustrating vertical RNP containment monitoring with radio altitude for a case where a large vertical bias is introduced to the true airplane position.

FIG. 2 illustrates monitoring in a case where an alert would be generated. More specifically, FIG. 2 illustrates the VRNPC monitoring for a case where a large (in this case 35 meters) vertical bias is introduced to the true airplane position. Because the thresholds increase as a function of distance, the 35-meter bias does not cause the RA observations to exceed the thresholds early in the approach. However, later in the approach the bias in the airplane position does cause the lower threshold to be exceeded, which would result in an alert condition (e.g., an "Unable Vertical RNP" message could be displayed to the pilot.)

It should be noted that although the discussion throughout is in regard to RA monitoring when the airplane is flying a barometric VNAV path, the technique is general in that it could be applied if other sources were being used as the primary guidance. For example, if GNSS-based vertical positioning were being used to fly a so-called Approach with Vertical Guidance (APV) approach, the VRNPC monitoring could be applied with even tighter thresholds based on the improved guidance accuracy. The important thing is that the RA be independent of the primary guidance source. (This is significant because in the future modernized GPS and the addition of other constellations to GNSS could make APV operations available globally without the need for any augmentation system such as SBAS (WAAS). This VRNPC monitoring would be a natural fit for such a capability and could allow even lower minimums to be achieved directly from the satellites.

Furthermore, it should be noted that VRNPC monitoring could be applied even if the primary vertical guidance signal were derived based on RA observations relative to the $RA_{Ref}(d)$. In this case, additional redundancy management would be required to ensure that the monitoring and primary guidance were not susceptible to a common mode failure condition.

When an airplane uses the RA monitoring as described above, it is possible to relate the threshold values to a containment value around the desired path. If no alert is raised, that implies that the RA error plus the magnitude of the TSE bias is less than the threshold. Hence, if a distribution for the RA fault-free error can be determined, it should be possible to determine a distance beyond the threshold magnitude that corresponds to the containment value for a given probability. Details concerning the computation of the containment values are given in a section below. However, simply stated, the difference between the instantaneous RA measurement and the $RA_{Ref}(d)$ should be equal to the total system error plus the RA error.

$$RA(d)-RA_{Ref}(d)=TSE+RA_e+E_{RR}+E_{LU} \qquad [2]$$

where $E_{RR}$ is the error in the $RA_{Ref}(d)$, i.e., the systematic error in estimation of the expected value of the RA measurement at distance d. The quality of this estimate depends on how many observations are used to develop the estimate. With enough data the impact of this error source can be made negligible. $E_{LU}$ is the error in the estimation of the distance d along the path that projects into the vertical direction. This error is a function of the angle of the reference path as well as the specific shape of $RA_{Ref}(d)$. So a distribution that accounts for $E_{LU}$ will also be a function of d. If there is no alert, then $$|RA(d)-RA_{Ref}(d)| \leq |RA_T(d)-RA_{Ref}(d)|=RA_{T0}(d) \qquad [3]$$

where $RA_{T0}(d)$ is the magnitude of the distance from $RA_T(d)$ to the RA reference $RA_{Ref}(d)$. This can also be seen as the threshold for the detection of the deviation of the airplane position from the desired reference path. So, if there is no alert, $$|TSE| \leq |RA_{T0}(d)|-RA_e-E_{RR}-E_{LU} \qquad [4]$$

The TSE is less than the threshold referenced to the desired path minus the RA fault-free error and the error in the RA reference path. If the distribution of the RA fault-free error is known, then one can determine the size of the Vertical Containment Level (VCL) such that:

$$p(TSE>VCL) \leq P_{CR} \qquad [5]$$

So, substituting (and recognizing that the worst case condition is when $TSE=RA_{T0}(d)-RA_e$ for the high threshold or $TSE=RA_{T0}(d)+RA_e$ for the low threshold):

$$p(|RA_e+E_{RR}|>|VCL-RA_{T0}(d)|) \leq P_{CR} \qquad [6]$$

So for example, if the combined effects of $(RA_e+E_{RR}+E_{LU})$ is assumed to be Gaussianly distributed, with a variance of $\sigma_r^2$, then a value of $K_{md}$ can easily be determined such that:

$$\frac{P_{CR}}{2} = \frac{1}{\sigma_r\sqrt{2\pi}}\int_{-\infty}^{K_{md}\sigma_r} e^{\frac{-x^2}{2\sigma_r^2}}dx \qquad [7]$$

($K_{md}$ is the number of standard deviations away from zero needed to integrate the normal probability density function to get half the target probability.) Note the probability is divided by 2 because it is assumed that the TSE is to be symmetrically bounded about the desired path with ±VCL. So the high case and low case each get half the total containment probability. Then $$K_{md}\sigma_r = VCL - RA_{T0}(d) \quad [8]$$

or $$VCL = RA_{T0}(d) + K_{md}\sigma_r \quad [9]$$

So the bound on the TSE (i.e., the Vertical Containment Level) about the desired path is such that the total probability that the airplane is outside of ±VCL of the desired path is less than $P_{CR}$. VCL is a function of only the RA threshold (referenced to the desired path) and the RA error distribution and $RA_{ref}$ estimation error. As a practical matter, Since the RA error is a function of height, the VCL will be a function of the distance d along the path, i.e., VCL(d).

Figure 3:
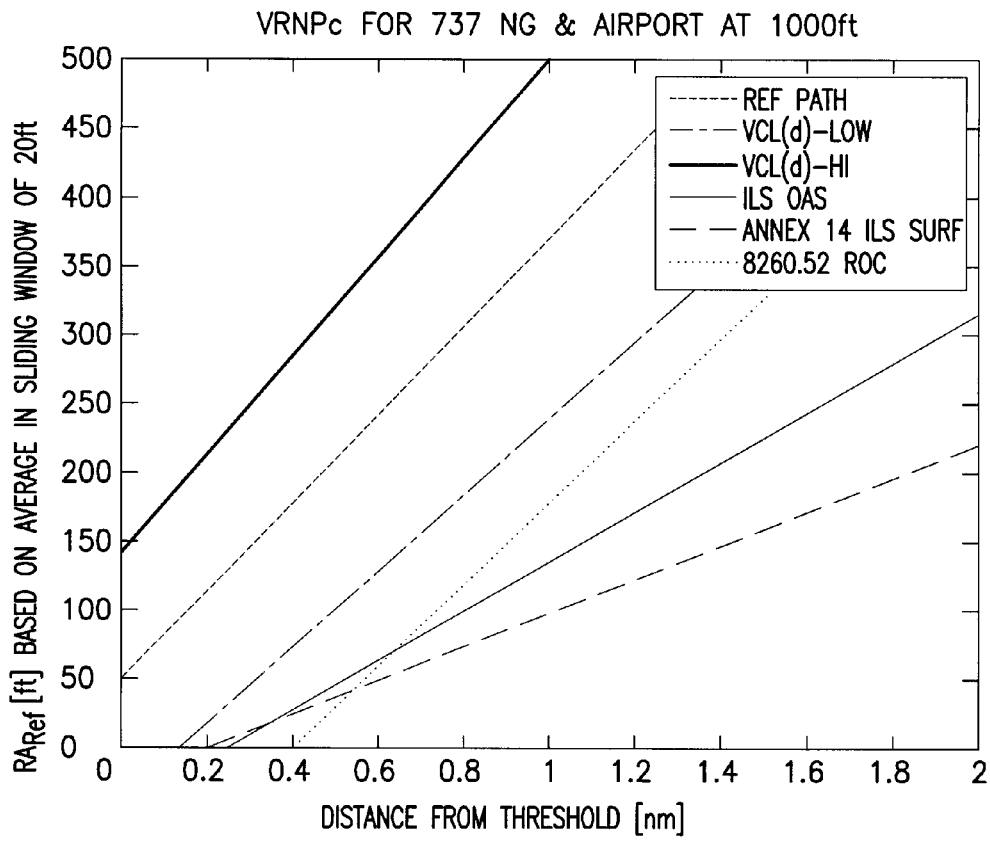
FIG. 3 is a graph illustrating vertical containment based on current RNP vertical error budget models.

FIG. 3 shows the values of VCL(d) as a function of distance from the runway that result when standard error models for NSE and TSE as currently used in RNP vertical error budgets are applied. Also, flight test data for RA measurements taken during approaches at Moses Lake airport were analyzed to assess the efficacy of the RA error model assumed in Table 1. The Radio Altimeter was assumed to have an accuracy of 2 m or 2% of the measured height above the terrain 1–σ, whichever is larger. For this analysis, $E_{RR}$ was conservatively assumed to be of the same accuracy as the Radio Altimeter divided by 2. (As a practical matter, $E_{RR}$ should be a small fraction of the Radio Altimeter error if enough observations are used to estimate $RA_{Ref}(d)$). For this scenario, the longitudinal error projection $E_{LU}$ was assumed to be 15 meters of longitudinal uncertainty projecting into the vertical based on a 3° glideslope. The assumption of 15 m 1–σ is conservative for GPS horizontal positioning. For this example, relatively flat, well-behaved terrain was assumed. In practice, complex terrain could inflate this $E_{LU}$ error, particularly around sharp transition or steep gradients in terrain. The scenario illustrated in FIG. 3 is for a 737 airplane landing at an airfield with an elevation of 1000 ft above sea level. For this case, when the desired reference path passes through a height of 200 ft above the runway surface, the vertical TSE is bounded to within 32 meters of the desired reference path with a probability of $1-1\times10^{-7}$ or greater. Also shown in FIG. 3 for reference are the basic ILS (Instrument Landing System) obstacle surface for ICAO Annex 14, Obstacle Assessment Surface (OAS) used by the ILS Collision Risk Model and the current Required Obstacle Clearance (ROC) function from FAA Order 8260.52. The computed VCL is well above all three surfaces. This implies that with respect to obstacle clearance, the vertical RNP containment monitoring should be able to support decision heights as low as any supported by the ILS. Furthermore, the 32 meters of bounding on the TSE can be compared to the LPV-200 service supported by WAAS which provides a $10^{-7}$ bound on the Navigation System Error component only. The VRNPC provides similar bounding and covers the TSE (which includes FTE contributions) as well. The FAA authorizes operations to the lowest CAT I minima based on LPV-200 service. It is logical that VRNPC should be able to attain the same minimums.

In Table 1, $P_{MD}$ is the target probability for the detector missing the fact that the airplane is outside the containment. Typically, $P_{CR}=P_{MD}\times P_{Prior}$, where $P_{Prior}$ is the a priori probability of a failure that will put the airplane outside the containment. Assuming the failure is independent of the monitor, the total probability of being outside the containment is the probability of the failure times the probability of not detecting the failure. But, in the example it is assumed that $P_{Prior}=1$, so $P_{CR}=P_{MD}$. They are identical in the example case because there is no credit taken for the prior probability of a failure.

Determining $RA_{Ref}(d)$ and Managing Thresholds

Figure 4:
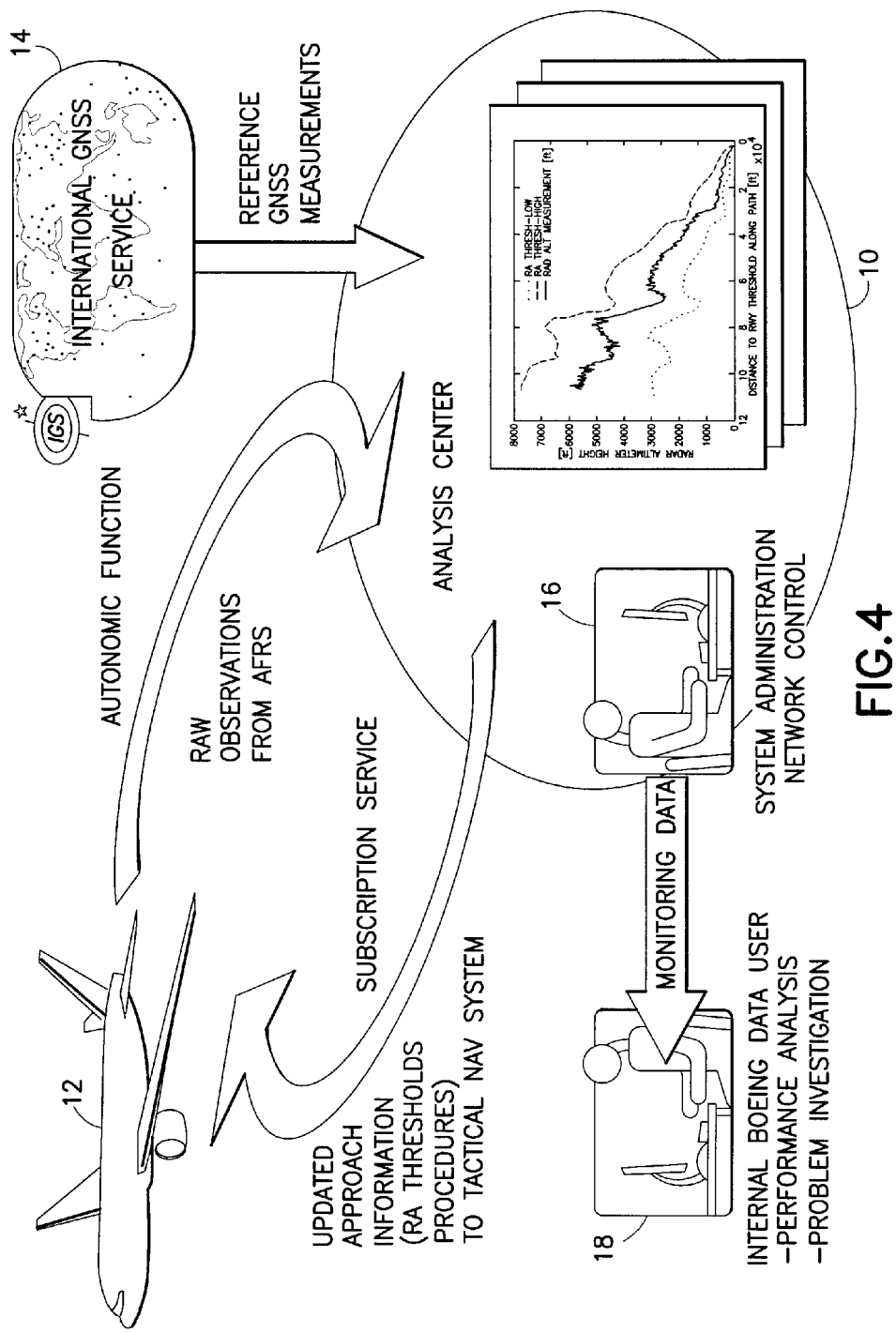
FIG. 4 is a block diagram showing a process for determining the expected radio altimeter measurement if the airplane were exactly on the desired reference path and managing thresholds in accordance with one embodiment.

From the discussion above, it can be seen that the monitor is rather simple. The more challenging part is determining the $RA_{Ref}(d)$ for each approach. In the current invention, this is done by observing RA and GPS measurements recorded over the course of multiple approaches. The process is illustrated in FIG. 4. First, an RNP/baro-VNAV approach is developed and implemented with minimums as high as can be achieved with current baro-VNAV systems. Then this approach is flown for some period of time by an airplane 12 which has an Automatic Flight Reference System (AFRS) on board. The AFRS consists of a dual-frequency GPS receiver of the type typically used in survey applications, some storage capability and some datalink capability. The AFRS can be remotely programmed over the datalink to record the GPS raw measurements on both frequencies whenever the airplane is within a specified range of an airport of interest. The AFRS also records baro-altitude, radio altitude and inertial system information. At some later time (perhaps shortly after leaving the area of the airport, or even hours later when a gate-link style datalink connection is available), the AFRS sends the recorded data over the Internet to a central processing facility 10. The central processing facility 10 obtains raw reference data for the same period of time from the nearest available Continuously Operating Reference Station (CORS) that is part of the International GNSS Service 14. With the raw GPS measurements made on the airplane and the ground-based measurements from the IGS, a post-processed differential "truth" position for the airplane can be computed. Such post-processed differential, dual-frequency carrier phase-based position solutions are well known in the art, and off-the-shelf software to compute these position solutions is available. This type of differential position solution is typically accurate to less than a decimeter even with separations of hundreds of kilometers between the airborne receiver and the ground-based reference station. With known reference position of the airplane, the recorded RA data can be re-referenced to the desired approach path. Observations over a number of approaches can be combined to determine $RA_{Ref}(d)$ for the approach. Also the variations in RA measurements over many approaches can be used to estimate the accuracy of the RA given the specific terrain characteristics. System administration network control 16 sends monitoring data to an internal Boeing data user 18 for performance analysis and problem investigation.

Network Centric Navigation Services (NCNS)

Figure 5:
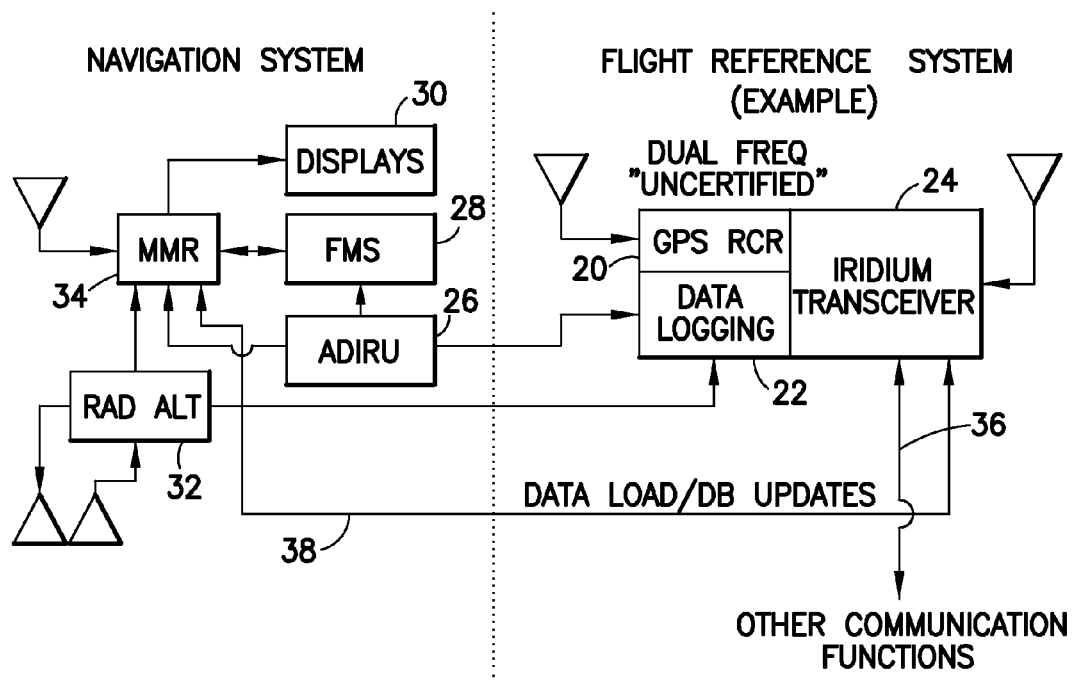
FIG. 5 is a block diagram showing two systems involved in closed loop network centric navigation services provided in accordance with one embodiment.

The general process illustrated in FIG. 4 can be realized as a continuous feedback loop where raw data is gathered from airplanes using the approach, analyzed and then the results are fed back to the airplane in the form of information to be used during final approach. This system/process in general is referred to herein as "Network Centric Navigation Services" (NCNS). In one embodiment of the invention, that feedback cycle associated with NCNS depends on two different systems on the airplane. These systems are illustrated in FIG. 5. The first system is an automated flight reference system (AFRS) that collects the raw data, stores it and eventually forwards the data to the analysis center 10 illustrated in FIG. 4. The second system is a navigation system of a type which already exists on modern airplanes, but with certain modifications necessary to allow the NCNS to update portions of the database used for approach. The data includes (but is not necessarily limited to) RA thresholds for VRNPC monitoring and approach path definitions. Some additional wiring in the airplane is required to enable the flight reference system to record information from the GNSS system, the radio altimeter 32, and the air-data inertial reference unit (ADIRU) 26. The air data part of the ADIRU provides airspeed, angle of attack, temperature and barometric altitude data, while the inertial reference part gives attitude, flight path vector, ground speed and positional data to the AFRS and to the flight management system (FMS) 28. It should be understood that, although the embodiment shown in FIG. 5 shows two separate systems, in principle it is feasible that all the functionality of both systems could be realized in a single package or via some other allocation of the functions across a number of physical packages. The two systems discussed here should be functional organizations and no limitations on packaging for physical realizations of the functions should be assumed.

The MMR 34 is a radio/processor capable of receiving ILS, MLS and GNSS source inputs. More specifically, the MMR 34 includes an ILS receiver, a GPS receiver, a VHF data-broadcast receiver (for GLS functions) and a processing unit to compute differential position and deviations (for GLS). All that is standard already. The standards also allow for an optional MLS receiver and, for one of the form factor options (the ARINC 756 version) an option for an FMS card. The instant invention adds a component not currently standard in the MMR: a large data storage device of some type to be used to store the database. The MMR 34 provides flight path deviation guidance to the cockpit display 30 during final approach and landing phases of flight. The MMR 34 also provides position and status information to the FMS. The MMR 34 receives signals from the radio altimeter 32 representing the distance between the plane and the ground directly below. Although the radio altimeter 32 shown in FIG. 5 uses separate transmit and receive antennas (indicated by respective triangles), there are designs that use a common antenna aperture.

The AFRS illustrated in FIG. 5 is a new system for the airplane. Today, modern aircraft include a flight data recorder, typically a digital flight data recorder (DFDR). The AFRS differs from the DFDR in several key ways. The DFDR is a required piece of equipment which records key airplane state parameters and data for use in airplane performance diagnostics and post-accident investigations. The AFRS, by way of contrast, is not intended for use in accident investigation and has no tactical use operationally. That is to say, the data collected by the AFRS is of low criticality on any particular flight. If the data is lost, there is no impact to the safety of that flight or any other flight. The data is only useful after post analysis and combination with other data from other flights.

The preferred embodiment of an AFRS includes a dual-frequency GPS receiver 20 capable of making high-quality code and carrier phase measurements of GPS satellite signals. The AFRS therefore requires a dual-frequency GPS antenna mounted somewhere on the top of the airplane with reasonably good visibility of the sky. The AFRS also includes some datalink functionality. That datalink functionality could be, for example, an Iridium data transceiver 24. The network functionality could also be realized with an 802.11 wireless network that would be active when the airplane is at the gate. In any case, it should be possible to combine the datalink antenna and GPS antennas such that only a single new antenna should be necessary for the AFRS. (Combined GPS-Iridium antennas are already available.) Since the AFRS in non-essential, a single system per airplane should be sufficient.

The preferred embodiment of the AFRS is remotely programmable via the datalink function. For example, an individual AFRS could be programmed via commands sent over the datalink 36 to record the necessary raw data whenever the GPS position is within a certain distance of some target latitude and longitude. A command processor and datalink management function are included in the AFRS to enable the remote control of the function.

When in an area of interest, the AFRS logs the following data: (1) all raw GPS measurements; (2) all radar altitude measurements (from all RA systems); (3) inertial data (described above) from the inertial reference part of the ADIRU; (4) air data (also described above); and (5) other data as required. This raw data is stored in on-board data logging memory 22 with appropriate time tags and essential identifying data. At some later time, the AFRS communications management function will forward the data to the analysis center for post-processing. As mentioned earlier, at the central processing facility, the raw GPS observations are combined with GPS measurements for the same time frame made by a reference station at a known location near the location of the airplane when the data was recorded. One means of doing this would be to use the closest CORS receiver that is part of the International GNSS service network. With this data, a carrier phase differential position solution can be computed with an accuracy of better than a decimeter.

The bus 38 supports the updates to the MMR database. The information to be transferred by the Iridium transceiver 24 would be the thresholds as a function of distance, the waypoints defining the nominal approach path and any other data needed to administer the database (version numbers, security certificates and all the usual overhead of a managed database).

The AFRS makes virtually every flight a flight inspection flight with highly accurate true airplane position available after the fact. There are many potential applications for such a system beyond just determining the radio altitude reference $RA_{Ref}(d)$ for VRNPC monitoring. For examples:

The AFRS could be used to map the elevation of airport surface maps. The elevation information could then be used to constrain a GPS position and enhance Fault Detection and Exclusion (FDE) for integrity of the GPS position during surface operations.

The AFRS could be used to log and study surface traffic flows.

The AFRS could be used to detect and study areas with problematic GPS reception. By doing this, interference sources could be detected and localized.

The AFRS data could be used to allow analysis of baro performance in greater detail than ever before, location by location. Statistical characterization of the baro accuracy could be used for improved vertical accuracy modeling to improve vertical RNP.

The AFRS data could allow baro performance to be monitored airplane by airplane over time—this would enable the detection of calibration issues with specific air data sensors. That could improve RSVM performance.

The AFRS data could be valuable information to help debug GPS anomalies anywhere they occur.

The AFRS data could be used as a truth reference to continuously flight inspect distance measuring equipment (a transponder-based radio navigation technology that measures distance by timing the propagation delay of VHF or UHF radio signals) and other navigation aids. Apparent out-of-tolerance conditions could be reported to service providers.

Many other applications are likely to become apparent over time as the implications of a very accurate post-processed airplane "truth" system become clearer.

The existence of very accurate position data and logging of other information with remote data logging control may create many opportunities.

Figure 6:
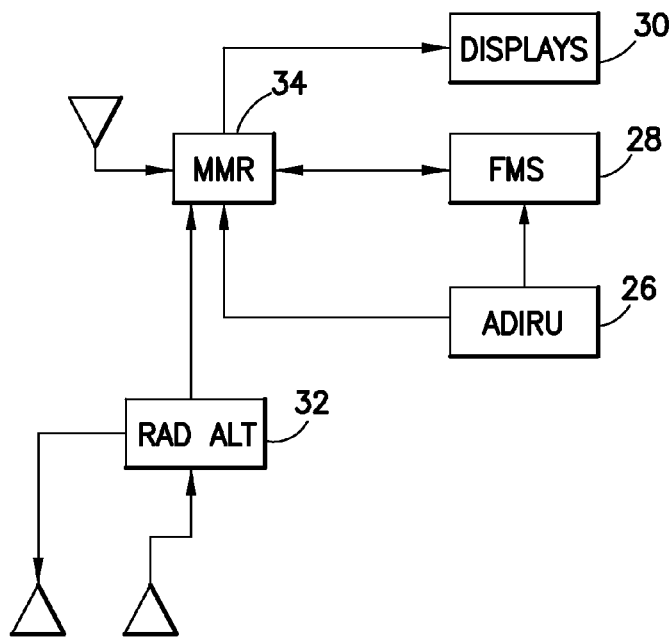
FIG. 6 is a block diagram showing a tactical navigation system component of the closed loop network centric navigation services provided in accordance with the embodiment depicted in FIG. 5.

FIG. 6 illustrates the tactical navigation system portion of the NCNS. The system is an FMS-based RNP-capable multi-sensor navigation system. The architecture illustrated in FIG. 6 is one possible way (but not the only way) to implement VRNP containment monitoring. In this architecture, a radio altimeter 32 is wired to a multi-mode receiver (MMR) 34 and the monitor algorithms (calculations) are performed in the MMR. Similarly, the thresholds are stored in a database that is housed in the MMR 34. In this architecture, the VRNPC monitoring can be implemented as an independent function in that the FMS 28 is not involved. The alerts generated by the VRNPC monitoring are sent directly to the cockpit displays 30. In the alternative or in addition to visual indicators, aural indicators (either tone or voice) may be given to the pilot by the system. Aural messages can be generated using either a tone generator or a voice simulator. For example, a voice message could be automatically generated that annunciates an alert when either radio altitude threshold has been reached.

The MMR 34 in this architecture includes a new database and a database management function that communicates with and through AFRS. Placing the database that supports VRNPC monitoring in the MMR 34 has the advantage that other data can also be managed and provided as part of the NCNS. For example, the approach path definitions can be stored in the database which will allow the MMR to produce deviations relative to the approach path in a manner similar to the guidance provided by the ILS. In this way, all the new approach functions can be "xLS" (i.e., ILS like). Thus, approach paths that are defined referenced to geometric altitude can be included. This allows the MMR to support so-called Localizer Performance with Vertical guidance (LPV) type approaches.

Although the architecture illustrated in FIG. 6 shows a "single thread" of equipment, extensions of the VRNPC scheme to include equipment redundancies are straightforward. For example, inputs from multiple radio altimeters to each monitor could be used. By averaging and/or voting multiple inputs, improvements can be made to both the noise performance and the integrity of the overall solution. This would allow faults in radio altimeters to be detected and mitigated.

Computing $RA_{Ref}(d)$

The following section explains one possible method for computing $RA_{Ref}(d)$, $RA_{Thi}(d)$ and $RA_{Tlo}(d)$. Other methods and variations on this method are possible. The VRNPC monitoring uses the thresholds $RA_{Thi}(d)$ and $RA_{Tlo}(d)$ as the basis for raising an alarm that the airplane's position is too far from the desired flight path in the vertical limit. As with any monitor, there are two design considerations: (1) the thresholds must be set high enough such that the probability of a false alarm ($P_{FA}$) is sufficiently low, and (2) the thresholds must be set tight enough to be effective in detecting and containing the effects of real fault conditions. The design of a monitor is always a balancing between these two conflicting requirements.

To ensure an acceptable probability of false alarm $P_{FA}$ is achieved, it is necessary to characterize the distribution of the fault-free performance of the system and the detection parameter (or, as it is often called, the "detection statistic") of the system. In this case the detection statistic for the monitor is the instantaneous radio altitude observation $RA(d)$. $RA_{T0}(d)$ is related to $RA_{Ref}(d)$ and $RA_e$ as defined in Eq. [2] above. Rearranging Eq. [2]:

$$TSE + RA_e + E_{RR} + E_{LU} = RA(d) - RA_{Ref}(d) = V_x \quad [10]$$

where $V_x$ is the detection statistic re-referenced to $RA_{Ref}(d)$.

Since TSE is the additive combination of FTE and NSE, we can write:

$$FTE + NSE + RA_e + E_{RR} + E_{LU} = V_x \quad [11]$$

Figure 7:
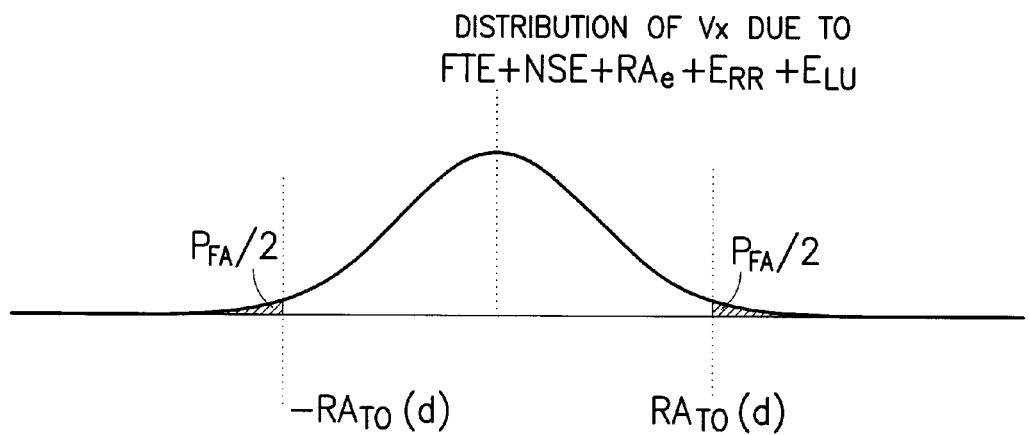
FIG. 7 is a graph illustrating the general process for setting the thresholds for a detection statistic Vx in accordance with one embodiment.

So the detection statistic referenced to $RA_{Ref}(d)$ is composed of the FTE, the NSE (i.e., the baro-altimetry errors), the error in the $RA_{Ref}(d)$, RA errors and the error projection from longitudinal uncertainty. Given models for each of these error sources, a distribution for $V_x$ can be determined and then a value of a threshold $RA_{T0}(d)$, that would provide an acceptable probability of false alarm $P_{FA}$. This is done by characterizing the joint distribution and then picking $RA_{T0}(d)$ so that the total probability mass in the tails of the distribution outside $\pm RA_{T0}(d)$ is equal to $P_{FA}$. FIG. 7 illustrates the general process for setting the thresholds for the detection statistic $V_x = RA(d) - RA_{Ref}(d)$.

What follows is one example of how thresholds could be set. Assume that FTE, $RA_e$, and the baro-altimetry errors can be characterized by zero mean Gaussian distributions. Then the distribution of $V_x$ will also be a zero mean normal distribution given by:

$$\sigma_{V_x} = \sqrt{\sigma_{FTE}^2 + \sigma_{baro}^2 + \sigma_{RA}^2 + \sigma_{RR}^2 + \sigma_{Atrk}^2} \quad [12]$$

where $\sigma_{FTE}$ is the standard deviation of the distribution of Flight Technical Error about the indicated reference path (generally speaking, FTE reflects the inability of the pilot or autopilot to fly the indicated path); $\sigma_{baro}$ is the standard deviation of the distribution of barometric altimeter error; $\sigma_{RA}$ is the standard deviation of the distribution of radio altimeter error; $\sigma_{RR}$ is the standard deviation of the distribution of error in the estimate of the expected RA measurement (i.e., $RA_{Ref}(d)$); and $\sigma_{Atrk}$ is the standard deviation of a distribution that accounts for the uncertainty in the vertical position due to a projection of the along track position uncertainty, $E_{LU}$, into the vertical (because the thresholds and reference paths are functions of the distance d along the path, any error in the estimation of the longitudinal distance along the path must be accounted for in the assessment of the probability of false alarm).

Once the distribution of the test statistic is established, the threshold value that satisfies the $P_{FA}$ requirement is computed by integrating the tail of the distribution of $V_x$ as defined by:

$$\frac{P_{FA}}{2} = \frac{1}{\sigma_{V_x}\sqrt{2\pi}} \int_{-\infty}^{\kappa_{FA}\sigma_{V_x}} e^{\frac{-x^2}{2\sigma_{V_x}^2}} dx \quad [13]$$

For a numeric example, consider the following assumptions which are consistent with vertical error budgets used currently in RNP applications. Table 1 (see next page) lists the assumptions made about the component error sources that were used to compute the thresholds and containment values shown in FIG. 3.

Again, it should be pointed out that the vertical error budget presented in Table 1 and FIG. 3 is just an example. A different vertical error budget would apply if a different source were used (e.g., GNSS positioning) as the primary vertical guidance.

While the invention has been described with reference to various embodiments, it will be understood by those skilled in the art that various changes may be made and equivalents may be substituted for elements thereof without departing from

TABLE 1

| Component | Modeled Variance | Comments |
|---|---|---|
| Flight Technical Error (FTE) | $\sigma_{FTE} = 16.5$ ft | For 737—Vertical FTE is assumed to be 49 ft 99.7%. For a Gaussian distribution this corresponds to 1-sigma as indicated. FTE is model specific, so the thresholds are also going to be model specific. |
| Baro-Altimetry Error | $\sigma_{baro} = 19$ ft | The following altimetry system error equation is consistent with Boeing systems and flight test data: ASE = (−8.8E−8 * H$^2$) + (6.5E−3 * H) + 50 ASE corresponds to a 99.7% number (approximately 3-sigma) For an airport at 1000 ft elevation, the 1-sigma value for ASE is as indicated to the left. |
| Radio Altitude Error | $\sigma_{RA} = \max(2, 0.02 * \text{RAref}(d))$ in feet | Radio Altimeters have an accuracy specification of max(1.5, 0.02*(height above the terrain (H$_{AT}$))). For this analysis we assumed slightly poorer performance (i.e., 2 ft) and assumed this specification to be the 1-sigma performance. This performance will actually be dependen on the specific terrain characteristics and may need to be assessed at each location. Data collected at Moses Lake has shown this model to be very conservative for that location. |
| RA$_{Ref}$(d) Uncertainty – E$_{RR}$ | $\sigma_{RR} = \dfrac{\max(2, 0.02 * \text{RAref}(d))}{2}$ in feet | Conservatively, the error distribution for E$_{RR}$ is assumed to be half that of the radio altimeters. |
| Projection of Longitudinal Uncertainty – E$_{LU}$ | $\sigma_{Atrk} = \dfrac{15 \text{ m}}{\tan(3°)}$ | Conservatively assumes GPS positioning with 30 m 95% and a projection into the vertical due to a 3° glide path. |
| Probability of False Alarm | P$_{FA}$ = 1 − 0.997 per independent sample This level of P$_{FA}$ results in: K$_{FA}$ = 2.9677 | Setting a reasonable P$_{FA}$ is tricky since it is essentially setting the allowable probability of initiating a missed approach when one would not really have been necessary. Also the exposure interval is difficult to quantify since some error components of V$_x$ are highly correlated in time and others are not. If V$_x$ is dominated by error sources that are highly time correlated (e.g., baro altimeter errors) then this level of P$_{FA}$ would imply 3 out of every 1000 approaches would experience an alert. |
| Probability of Missed Detection for Containment | P$_{MD}$ 10$^{-7}$ This level of P$_{MD}$ results in: K$_{MD}$ = 5.3267 | This assumed P$_{MD}$ correlates to the protection level containment required for GNSS-based approach and landing systems. The entire allowable risk is allocated to the P$_{MD}$. This is advantageous because no credit at all is taken for the a priori probability of the error. Hence, we can show this containment is effective in the presence of bias errors (e.g., mis-set altimeter corrections) without regard to the probability of the failure or error. |

The invention claimed is:

1. A method for detecting deviation of true airplane vertical position of an aircraft from a desired reference path, comprising the following steps:

acquiring radio altitude and GPS measurements over the course of multiple approaches by aircraft approaching a runway threshold;

deriving high and low radio altitude thresholds for a reference approach flight path from said acquired radio altitude and GPS measurements, wherein said high and low radio altitude thresholds vary as a function of horizontal distance from the runway threshold;

storing said high and low radio altitude thresholds on the aircraft;

acquiring radio altitude measurements as a function of horizontal distance from the runway threshold as the aircraft on which said high and low radio altitude thresholds are stored approaches the runway threshold; and comparing each radio altitude measurement to a respective corresponding pair of said high and low radio altitude thresholds as the aircraft on which said high and low radio altitude thresholds are stored approaches the runway threshold.

2. The method as recited in claim 1, further comprising the step of generating an indicator that indicates a radio altitude measurement was higher than a high radio altitude threshold or lower than a low radio altitude threshold as the aircraft on which said high and low radio altitude thresholds are stored approaches the runway threshold.

3. The method as recited in claim 1, wherein said deriving step comprises computing said high and low radio altitude thresholds as a function of reference radio altitudes representing expected radio altitude measurements were the aircraft to travel along said reference approach flight path.

4. The method as recited in claim 2, further comprising displaying said indicator on a cockpit display.

5. The method as recited in claim 1, wherein in said comparing step each radio altitude measurement is compared to a respective corresponding pair of said high and low radio altitude thresholds corresponding to the horizontal distance of the aircraft from the runway threshold when the radio altitude measurement is made.

6. The method as recited in claim 1, wherein said high and low radio altitude thresholds are set to ensure an acceptable probability of false alarms.

7. The method as recited in claim 1, wherein said high and low radio altitude thresholds are not derived from a terrain database.

8. The method as recited in claim 1, wherein the aircraft is flying a vertical navigation path based on vertical guidance from a source which is independent of radio altitude.

9. A method for detecting deviation of true airplane vertical position of an aircraft from a desired reference path, comprising the following steps performed by a processing system onboard the aircraft:
   (a) storing high and low radio altitude thresholds on an aircraft, wherein said high and low radio altitude thresholds vary as a function of horizontal distance from the runway threshold;
   (b) acquiring radio altitude measurements as a function of horizontal distance from the runway threshold as the aircraft on which said high and low radio altitude thresholds are stored approaches the runway threshold;
   (c) determining whether any of said radio altitude measurements are less than the corresponding low radio altitude thresholds as the aircraft approaches the runway threshold;
   (d) determining whether any of said radio altitude measurements are greater than the corresponding high radio altitude thresholds as the aircraft approaches the runway threshold; and
   (e) performing one of the following steps (i) through (iii) depending on the results of step (d):
      (i) generating a first alert signal as the aircraft approaches the runway threshold if a determination is made that any of said radio altitude measurements are less than the corresponding low radio altitude thresholds;
      (ii) generating a second alert signal as the aircraft approaches the runway threshold if a determination is made that any of said radio altitude measurements are greater than the corresponding high radio altitude thresholds; and
      (iii) not generating either of said first and second alert signals as the aircraft approaches the runway threshold if a determination is made that said radio altitude measurements are less than the corresponding high radio altitude thresholds and greater than the corresponding low radio altitude thresholds.

10. The method as recited in claim 9, wherein said high and low radio altitude thresholds are set to ensure an acceptable probability of false alarms.

11. The method as recited in claim 9, wherein said high and low radio altitude thresholds are not derived from a terrain database.

12. The method as recited in claim 9, wherein in said comparing step, each radio altitude measurement is compared to a respective corresponding pair of said high and low radio altitude thresholds corresponding to the horizontal distance of the aircraft from the runway threshold when the radio altitude measurement is made.

13. The method as recited in claim 9, wherein if either of said first and second alert signals is generated, further comprising displaying on a cockpit display a visual indicator corresponding to said generated first or second alert signal.

14. The method as recited in claim 9, wherein if either of said first and second alert signals is generated, further comprising generating an alert annunciation corresponding to said generated first or second alert signal using either a tone generator or a voice simulator.

* * * * *